United States Patent
Asakura et al.

(10) Patent No.: US 7,690,010 B2
(45) Date of Patent: *Mar. 30, 2010

(54) PHOTOSENSITIVE RECORDING MEDIUM CARTRIDGE

(75) Inventors: Katsuyoshi Asakura, Kanagawa (JP); Tomoyuki Takahashi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 800 days.

This patent is subject to a terminal disclaimer.

(21) Appl. No.: 11/505,897

(22) Filed: Aug. 18, 2006

(65) Prior Publication Data

US 2007/0044118 A1 Feb. 22, 2007

(30) Foreign Application Priority Data

Aug. 19, 2005 (JP) ............................ P.2005-238524

(51) Int. Cl.
*G11B 23/03* (2006.01)

(52) U.S. Cl. .................. 720/736; 720/726; 720/727; 720/738

(58) Field of Classification Search .......... 720/725–744
See application file for complete search history.

(56) References Cited

U.S. PATENT DOCUMENTS

| | | | | |
|---|---|---|---|---|
| 5,726,971 | A | * 3/1998 | Wanger et al. | 720/726 |
| 7,487,521 | B2 | * 2/2009 | Kawasaki et al. | 720/718 |
| 2001/0010680 | A1 | 8/2001 | Kikuchi et al. | |
| 2003/0198177 | A1 | 10/2003 | Horimai et al. | |
| 2006/0143642 | A1 | * 6/2006 | Kawasaki et al. | 720/738 |

FOREIGN PATENT DOCUMENTS

| | | | |
|---|---|---|---|
| JP | 05159509 A | * | 6/1993 |
| JP | 6-67348 A | | 3/1994 |
| JP | 10-312663 A | | 11/1998 |
| JP | 10310187 A | * | 11/1998 |
| JP | 2001043653 A | * | 2/2001 |
| JP | 2001-216754 A | | 8/2001 |
| JP | 2001-236754 A | | 8/2001 |
| JP | 2002343053 A | * | 11/2002 |
| JP | 2003-317422 A | | 11/2003 |
| JP | 2003-317424 A | | 11/2003 |
| JP | 2004-029476 A | | 1/2004 |

OTHER PUBLICATIONS

English-machine translation of Nirei et al. (JP 2003-317424), published on Nov. 7, 2003.*
Japanese Office Action dated Jul. 29, 2009.

* cited by examiner

*Primary Examiner*—William J Klimowicz
(74) *Attorney, Agent, or Firm*—Sughrue Mion, PLLC (57) ABSTRACT

A cartridge 2 receiving a photosensitive recording disc 4 therein including: a cartridge body 11 having inner openings 18 and 19 exposing part of the recording disc 4 to the outside; a light-shield plate 12 attached to the outside of the cartridge body 11 and having outer openings 14 and 15 which face the inner openings 18 and 19; and a shutter 13 opening/closing the inner openings 18 and 19 and the outer openings 14 and 15 between the cartridge body 11 and the light-shield plate 12; wherein recesses 25e and 26e for inserting end edges 12d of the outer circumference of the light-shield plate 12 are provided in light-shield plate attachment surfaces 25a and 26a of the cartridge body 11 so that when the end edges 12d are inserted into the recesses 25e and 26e and attached to the cartridge body 11, a labyrinth-shaped light-shielding structure is formed.

14 Claims, 11 Drawing Sheets

PHOTOSENSITIVE RECORDING MEDIUM CARTRIDGE

FIELD OF THE INVENTION

The present invention relates to a photosensitive recording medium cartridge receiving a photosensitive recording medium therein. Particularly, it relates to improvement in a photosensitive recording medium cartridge provided with a light-shield plate and a shutter for opening/closing an opening provided in a cartridge body.

BACKGROUND OF THE INVENTION

A holographic recording medium on which data are recorded holographically has been invented (e.g. see JP-A-2004-029476). The holographic recording medium is a photosensitive recording medium in which holographic recording layers each made of a photosensitive material are provided on a disc-shaped support. Data are multiplexedly recorded on the holographic recording medium as interference fringes of laser light, so that the holographic recording medium can obtain a larger data recording capacity than that of a DVD which is a recording medium heretofore widespread. Exposure of the holographic recording layers to light or deposition of dust on the holographic recording layers exerts a bad influence on the performance of the holographic recording medium. For this reason, the holographic recording medium is dealt with in the condition that the holographic recording medium is stored in a cartridge having a light-shielding function and a dustproof function (e.g. see JP-A-2003-317422 (corresponding to US 2003/0198177 A1)). In addition, there has been known a cartridge having a cartridge housing, a shutter plate and a cover (e.g. see JP-A-2003-317424).

In the invention described in JP-A-2004-029476, the holographic recording medium is stored in a cartridge similar to the cartridge of a DVD-RAM. The cartridge is made of a material low in transmittance of light rays in a wavelength range exerting influence on the holographic recording layers. Although JP-A-2004-029476 did not give any description on the detailed configuration of the cartridge, it may be conceived that the cartridge has the same configuration as that of the cartridge described in JP-A-2003-317422 (corresponding to US 2003/0198177 A1).

In the invention described in JP-A-2003-317422 (corresponding to US 2003/0198177 A1), the cartridge is made of a material capable of blocking light with a color sensitive to the holographic recording layers, and a sponge-like light-shield material is stuck to a mating portion of a movable portion for exposing the holographic recording medium to the outside. In addition, in the description, the cartridge is provided with a cartridge body for receiving a recording medium therein in a desirably rotatable state, an opening provided in the cartridge body and for exposing part of the recording medium to the outside, and a shutter for opening/closing the opening.

In the invention described in JP-A-2003-317424, overlap is provided between the circumference of the opening of the cartridge housing and the shutter plate and between the shutter and the circumference of the opening of the cover. This double-overlap prevents dust from entering from the outside.

SUMMARY OF THE INVENTION

In the cartridge receiving the holographic recording medium therein, when light shielding and dust-proof characteristic between the cartridge body and the shutter are not achieved appropriately, light and dust go into the cartridge so as to give a bad influence to the holographic recording medium. In JP-A-2004-029476, however, there is no description about a light-shielding and dust-proof structure between the cartridge body and the shutter.

In the cartridge described in JP-A-2003-317422 (corresponding to US 2003/0198177 A1), although light shielding between the cartridge body and the shutter is performed by the sponge-like shielding material, there is a problem that proper light shielding and dust-proof characteristic cannot be achieved when the shielding material is peeled or deteriorates. In the cartridge described in JP-A-2003-317422 (corresponding to US 2003/0198177 A1), no cartridge cover is provided so that the shutter is exposed to the outside directly. For this reason, there is fear the shutter is opened erroneously and the shutter is deformed when a large external force acts on the shutter. Thus, there is a possibility that the holographic recording medium cannot be used any more due to exposure to light.

In the cartridge described in JP-A-2003-317424, the cartridge cover has a shutter protection function because the cartridge cover is received in and attached to a recess formed in the cartridge housing. The dust-proof structure has been described, but the light-shielding structure has not been described. It is therefore cannot said that the photosensitive recording medium cartridge has sufficient performance.

The invention was developed under such circumstances. An object of the invention is to provide a photosensitive recording medium cartridge in which light shielding and dust-proof characteristic between a cartridge body and a light-shield plate can be achieved appropriately so that a photosensitive recording medium can be prevented from exposure to light and dust.

The foregoing object of the invention is achieved by a photosensitive recording medium cartridge as follows.

(1) A photosensitive recording medium cartridge including: a disc-shaped photosensitive recording medium; a cartridge body receiving the photosensitive recording medium therein so that the photosensitive recording medium can rotate, the cartridge body having a first opening exposing a center and a recording surface of the photosensitive recording medium to the outside; a light-shield plate attached to the outside of the cartridge body and having a second opening which faces the first opening and which exposes the center and another recording surface of the photosensitive recording medium; and a shutter which is put between the cartridge body and the light-shield plate, which is disposed so as to be movable between a close position for closing the first opening and an opening position for closing the first opening and which has an external size larger than each of the first opening and the second opening, wherein the cartridge body is provided with recesses into which end edges of the outer circumference of the light-shield plate are inserted.

According to the photosensitive recording medium cartridge configured as described above, the end edges of the light-shield plate are inserted into the recesses provided in the cartridge body so that a labyrinth-shaped light-shielding structure formed by the end edges of the light-shield plate and the recesses of the cartridge body is formed. In this manner, light shielding between the end edges of the light-shield plate and the cartridge body can be performed effectively so that the photosensitive recording medium can received in a clean state without being exposed to light.

(2) A photosensitive recording medium cartridge according to the paragraph (1), wherein the end edges of the light-shield plate are forced into the recesses so that the light-shield plate is fixed to the cartridge body.

According to the photosensitive recording medium cartridge configured as described above, the end edges of the light-shield plate are forced and fixed into the recesses of the cartridge body so that light-shielding performance is improved and the light-shield plate can be fixed to the cartridge body without use of any fixation member such as a screw to thereby result in reduction in the number of constituent components. In addition, there is no member protruding toward the outside so that the value of the product having its external appearance not spoiled is improved and it is possible to prevent a protrusive member from being caught by another member etc. unintentionally.

(3) A photosensitive recording medium cartridge according to the paragraph (1) or (2), wherein the cartridge body, the light-shield plate and the shutter are formed from a plastic to which 0.01% by weight to 5.00% by weight of a light-shield substance are added, and/or a metal thin plate.

According to the photosensitive recording medium cartridge configured as described above, light transmittance of the cartridge body, the light-shield plate and the shutter can be reduced so that the light-shielding performance of the cartridge can be improved.

(4) A photosensitive recording medium cartridge according to any one of the paragraphs (1) through (3) wherein the cartridge body is formed so that an inner surface of the cartridge body to the photosensitive recording medium and an outer surface of the cartridge body to the shutter are matted or embossed with a surface roughness Ra of 5 to 20 μm.

In this manner, light can be diffused and attenuated by the rough surface even when light enters the inside of the cartridge or between the cartridge body and the shutter. Accordingly, influence on the photosensitive recording medium can be reduced.

(5) A photosensitive recording medium cartridge according to any one of the paragraphs (1) through (4) wherein the cartridge body includes a first shell substantially shaped like a plate, and a second shell lap-welded with the first shell, the first and second shells being made of one and the same thermoplastic or similar thermoplastics, the other components inclusive of the shutter being made of materials different from the materials of the first and second shells.

In this manner, it is possible to prevent the first and second shells from being welded to the other components when the first and second shells are welded to each other.

(6) A photosensitive recording medium cartridge according to any one of the paragraphs (1) through (5) wherein 0.01% by weight to 5.00% by weight of a light-shield substance are added to a plastic used for molding each of the first and second shells and the shutter.

(7) A photosensitive recording medium cartridge according to any one of the paragraphs (1) through (6) wherein, when carbon black is used in a plastic used for molding each of the first and second shells and the shutter, 0.01% by weight to 2.00% by weight of carbon black are added to the plastic.

According to the configuration as described in the paragraph (6) or (7), light transmittance between the cartridge body and the shutter can be reduced so that the light-shielding performance of the cartridge can be improved.

(8) A photosensitive recording medium cartridge according to any one of the paragraphs (1) through (7), wherein 0.1% by weight to 5.0% by weight of a silicon-based lubricant are added to a plastic used for molding each of the first and second shells and the shutter.

In this manner, operation of the shutter becomes smooth, so that it is possible to prevent chips etc. from being generated due to friction between the shutter and the cartridge body.

(9) A photosensitive recording medium cartridge according to any one of the paragraphs (1) through (8) wherein the photosensitive recording medium is a holographic recording medium.

According to the photosensitive recording medium cartridge configured as described above, the holographic recording medium can be stored in the cartridge body in a clean state without being exposed to light.

According to the invention, it is possible to provide a photosensitive recording medium cartridge in which light shielding and dust-proof characteristic between a cartridge body and a light-shield plate can be achieved appropriately so that a photosensitive recording medium can be prevented from exposure to light and dust.

BRIEF DESCRIPTION OF THE DRAWINGS

FIGS. 6A to 6C are sectional views of the cartridge in a mounting direction, wherein FIG. 6A is an overall view, FIG. 6B is an enlarged view of an important portion, and FIG. 6C is an enlarged view of another important portion.

FIGS. 7A and 7B are sectional views of the cartridge in a direction perpendicular to the mounting direction, wherein FIG. 7A is a sectional view of a state in which the shutter is closed and FIG. 7B is a sectional view of a state in which the shutter is opened.

DETAILED DESCRIPTION OF THE INVENTION

Figure 1:
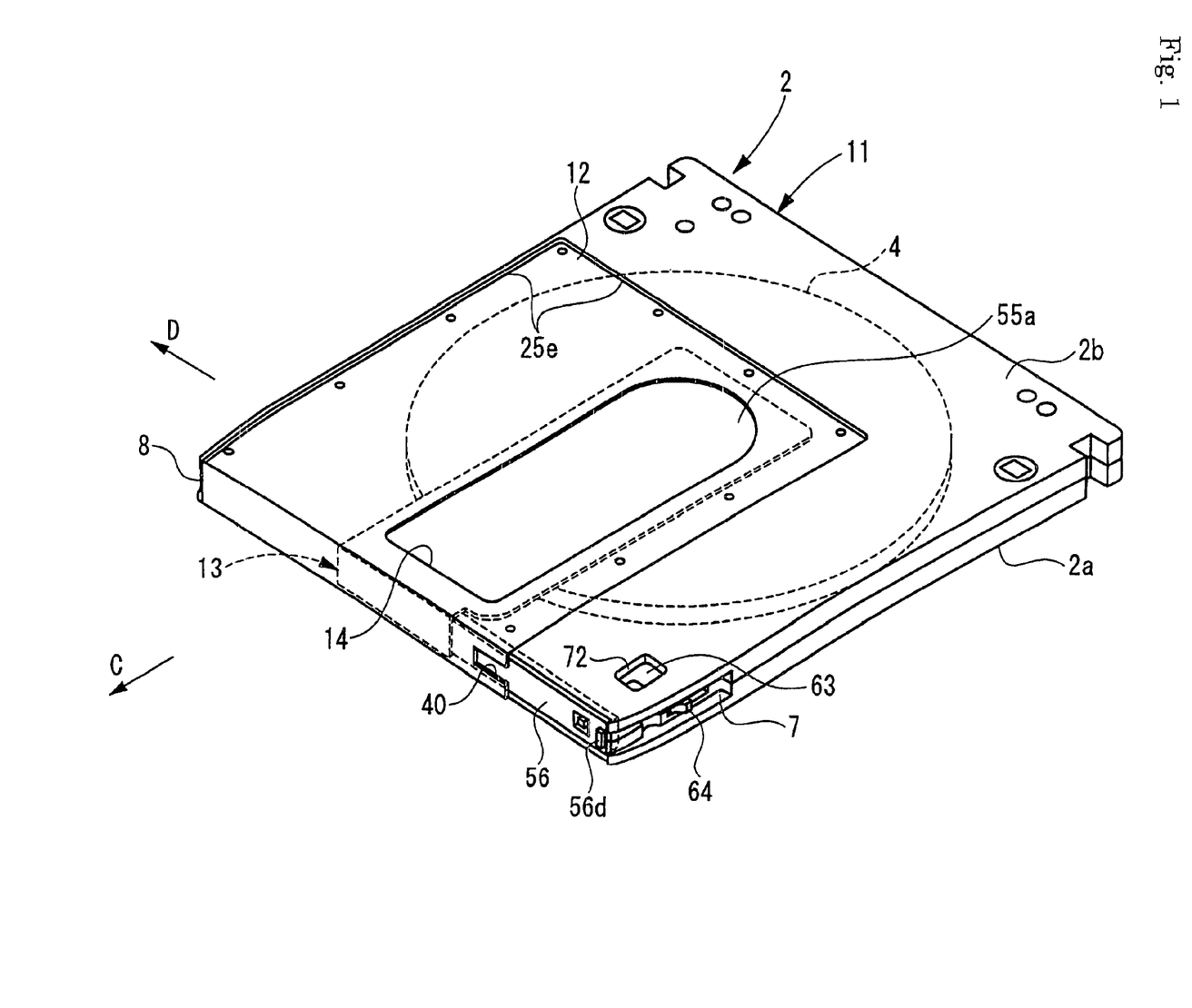
FIG. 1 is a perspective view showing the shape of external appearance of a cartridge for carrying out the invention.
Figure 2:
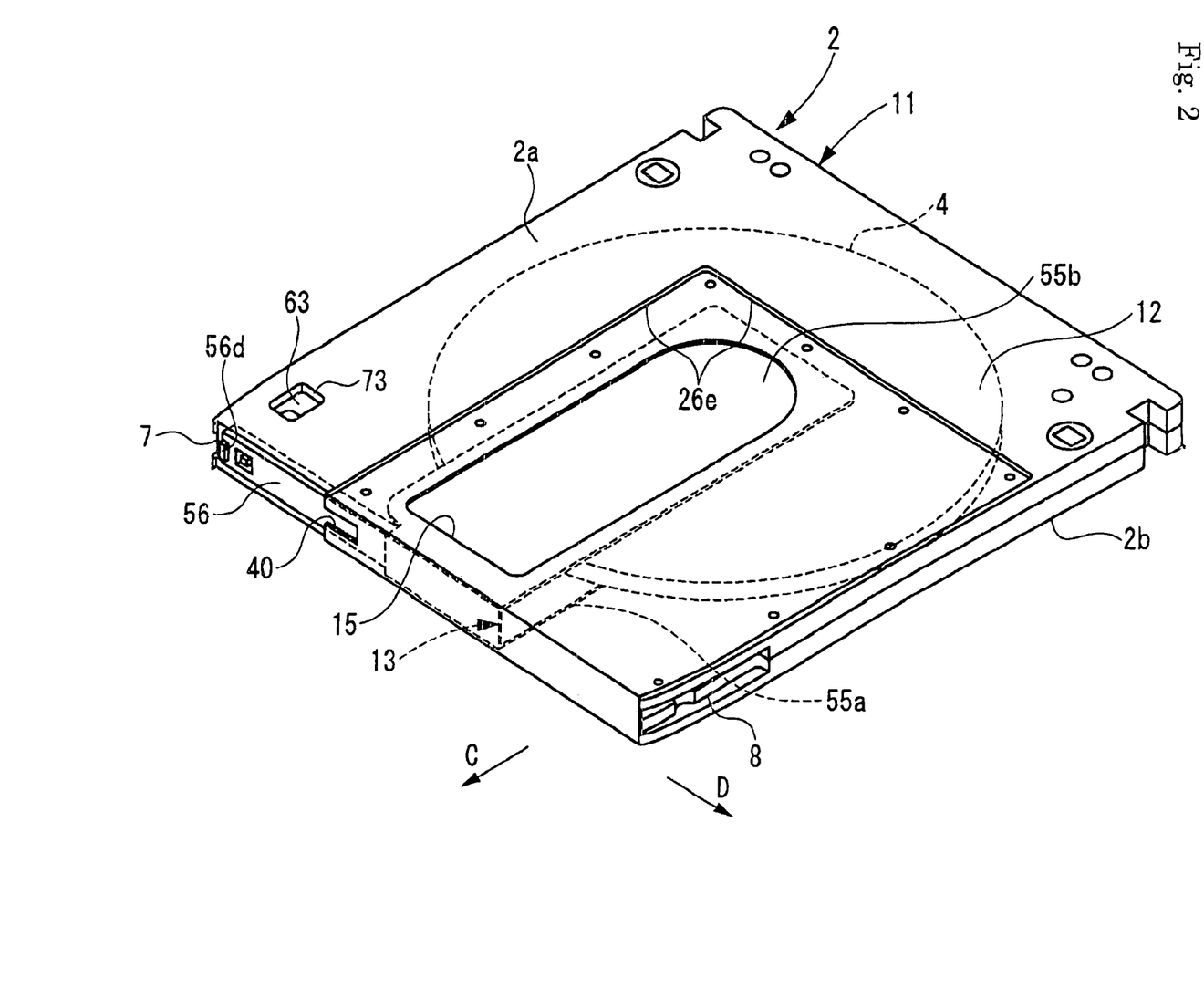
FIG. 2 is an external appearance perspective view showing an opposite surface of the cartridge.
Figure 3:
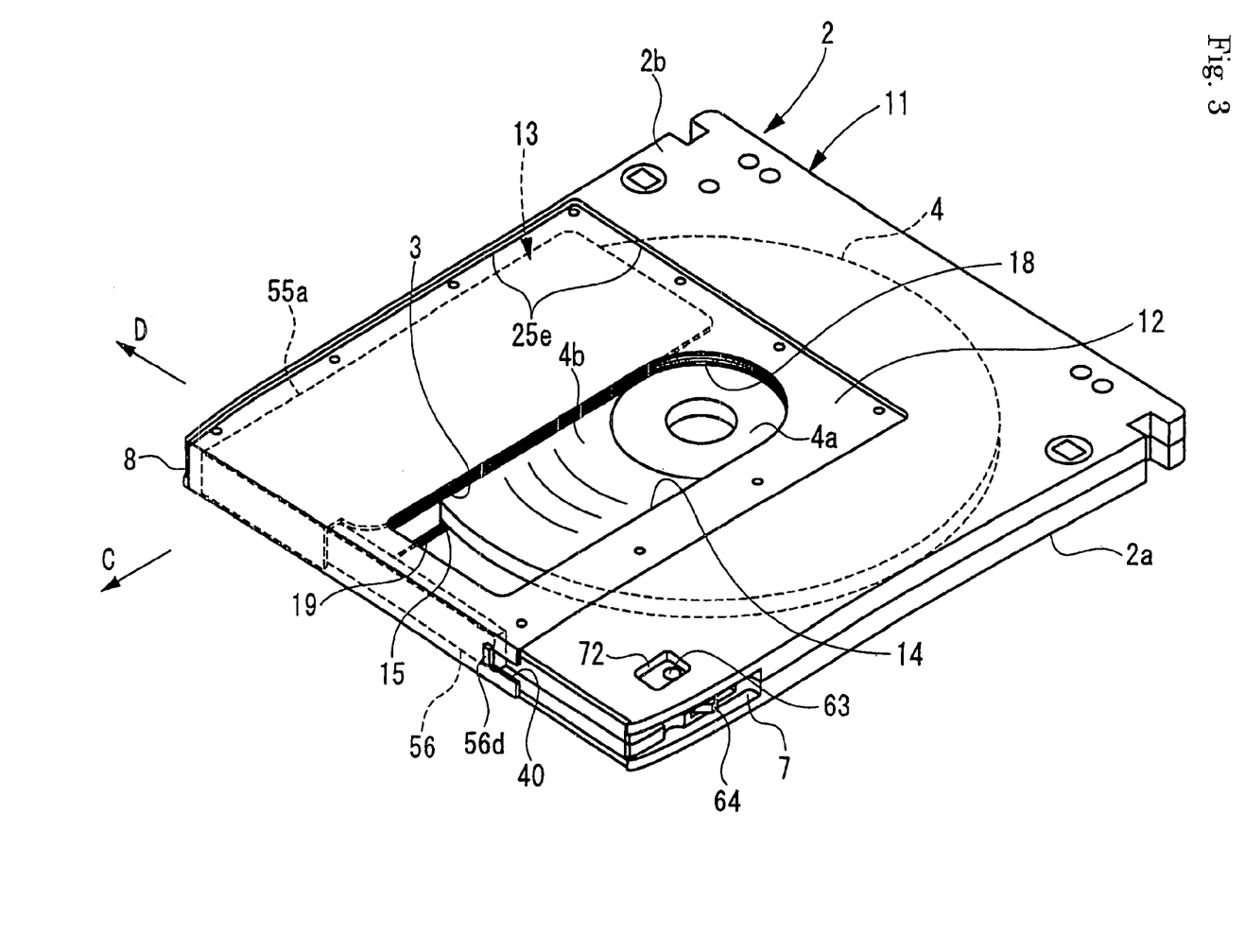
FIG. 3 is an external appearance perspective view showing a state in which a shutter of the cartridge is opened.

An embodiment of the invention will be described below in detail with reference to the drawings. FIGS. 1 to 3 are perspective views each showing the shape of external appearance of a holographic recording medium cartridge (hereinafter referred to as cartridge simply) according to the embodiment of the invention. FIG. 1 is a perspective view showing a state in which a surface of the cartridge faces up. FIG. 2 is a perspective view showing a state in which an opposite surface of the cartridge faces up. FIG. 3 is a perspective view showing a state in which a shutter is in an open position and a holographic recording medium (hereinafter referred to as recording disc) shaped like a disc is received rotatably in a disc storage portion.

As shown in FIGS. 1 to 3, the cartridge 2 is mounted, in a direction of an arrow C, into a holographic recording apparatus etc. for handling the cartridge. Positioning grooves 7 and 8 are provided in opposite side surfaces of a front end of the cartridge 2 in the mounting direction. When the cartridge 2 is mounted in various apparatuses such as a holographic recording apparatus etc., positioning members provided in each apparatus are inserted into the positioning grooves 7 and 8.

A recording disc 4 is a holographic recording disc having a hole formed in its central portion. Holographic recording layers are provided in opposite surfaces of the recording disc 4. For example, on each of the holographic recording layers, data are multiplexedly recorded as interference fringes of laser light by the laser light in a range of from a green wavelength of 532 nm to a blue wavelength of 405 nm. Incidentally, a reinforcement material may be added to the hole portion of the recording disc 4. In order to record data on the opposite recording surfaces of the recording disc 4, the cartridge 2 is set in the holographic recording apparatus while an A surface 2a or a B surface 2b of the cartridge 2 is made to face up.

The cartridge 2 includes a cartridge body 11, a light-shield plate 12, and a shutter 13. A disc storage portion 3 is provided in the cartridge body 11. The light-shield plate 12 is attached to the outside of the cartridge body 11 so as to sandwich the cartridge body 11. The shutter 13 is put between the cartridge body 11 and the light-shield plate 12. Outer holes 14 and 15 each substantially shaped like a rectangle as a second opening are formed in upper and lower surfaces of the light-shield plate 12, respectively. These outer holes 14 and 15 are closed with a first shutter 55a and a second shutter 55b when the shutter 13 is in a close position.

When the shutter 13 is moved to an open position in a direction of an arrow D as shown in FIG. 3, inner holes 18 and 19 having the same shapes and provided in the cartridge body 11 are opened together with the outer holes 14 and 15, so as to face the outer holes 14 and 15 respectively. Thus, a central portion 4a and recording surfaces 4b of the recording disc 4 which is received in the disc storage portion 3 are exposed to the outside.

The shutter 13 is urged to the close position by an internal shutter spring and locked in the close position by a lock mechanism. The lock based on the lock mechanism is released in such a manner that while a second lock member 64 protruding in the positioning groove 7 is forced into the inside of the cartridge 2, a first lock member 63 exposed from openings 73 and 72 in the A surface 2a and the B surface 2b of the cartridge 2 is slid toward a rear end side of the cartridge in the mounting direction. In this manner, the shutter 13 is locked in the close position by the lock mechanism in the condition that the shutter 13 cannot be unlocked without the two-stage operation. Accordingly, the shutter 13 is prevented from being opened unintentionally.

Figure 4:
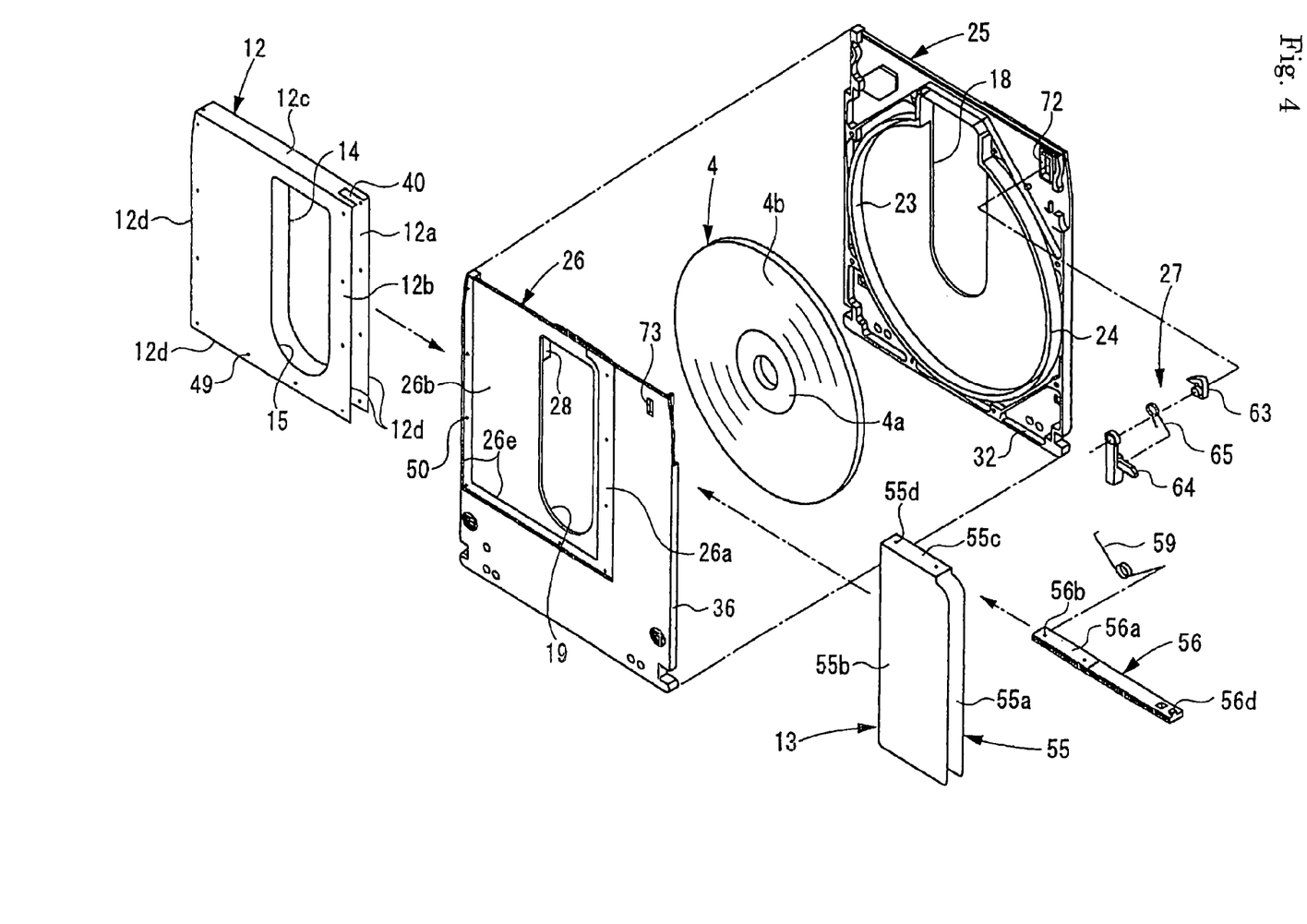
FIG. 4 is an exploded perspective view showing the configuration of the cartridge.
Figure 5:
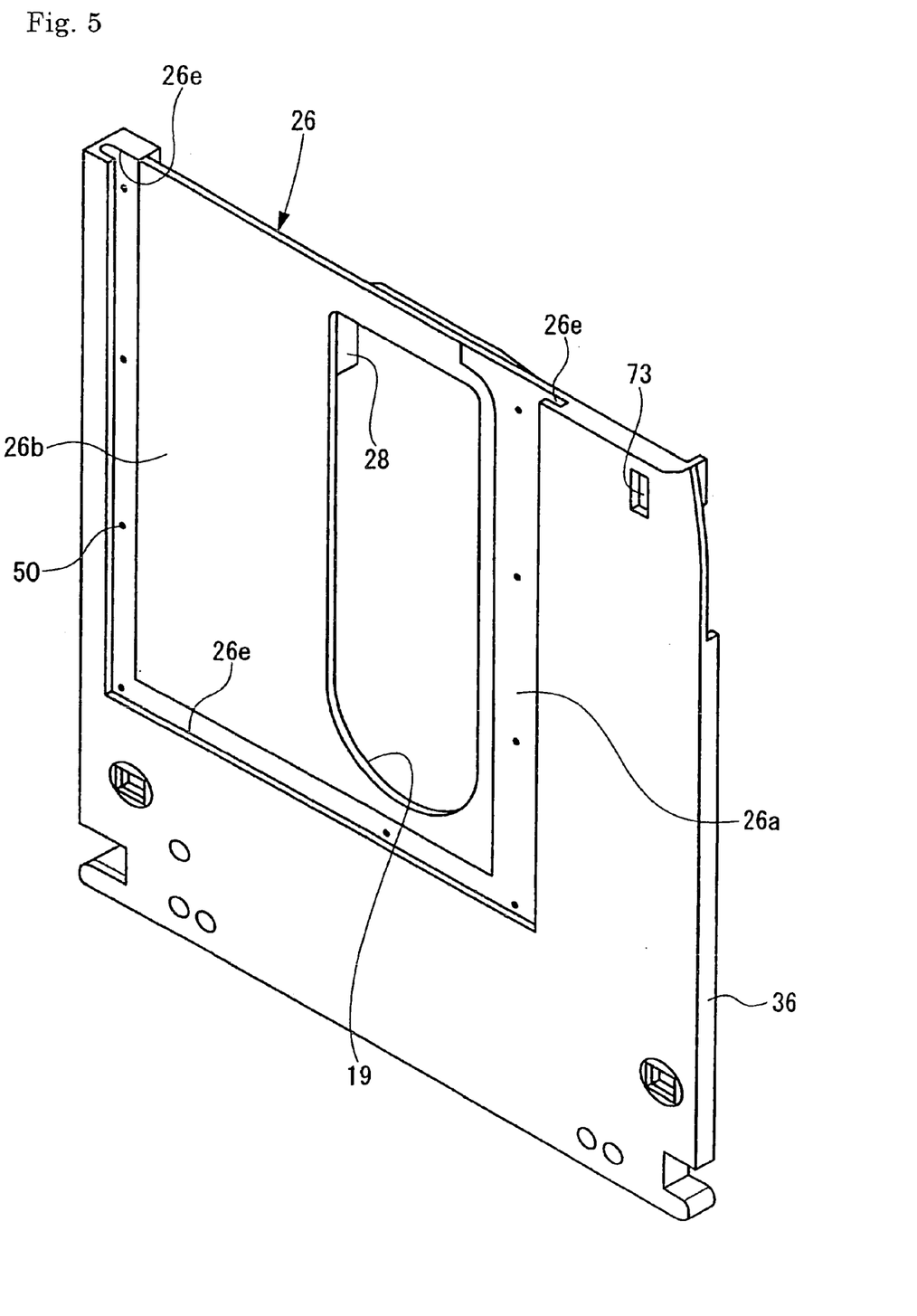
FIG. 5 is an enlarged perspective view of a second shell which is a constituent member of the cartridge body.
Figure 6A:
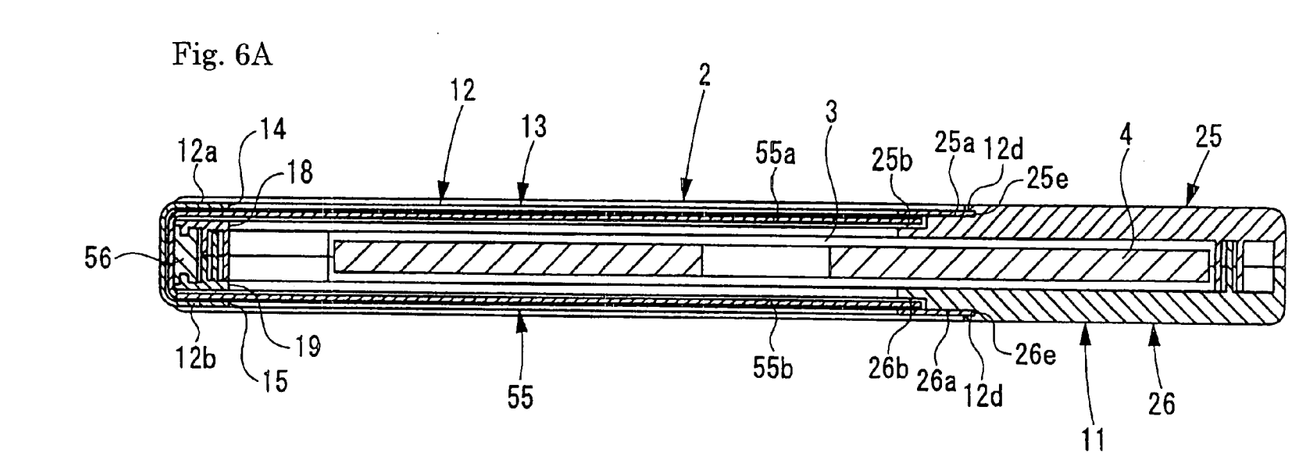
Figure 6B:
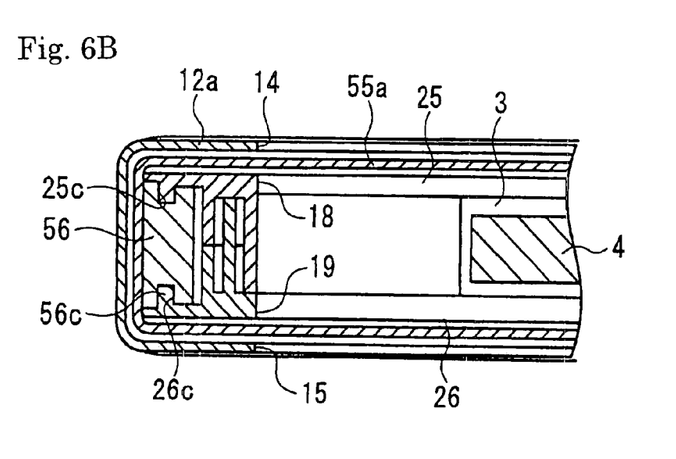
Figure 6C:
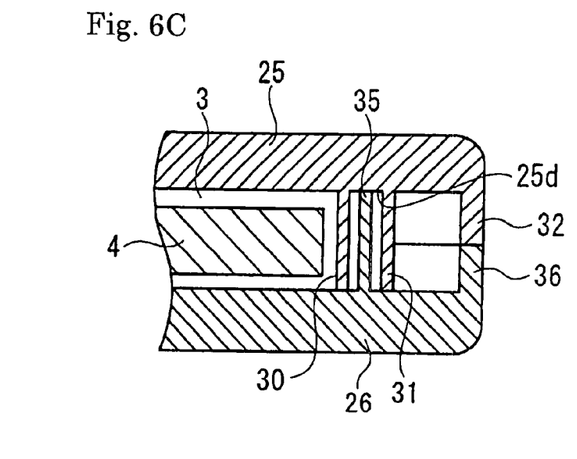
Figure 7A:
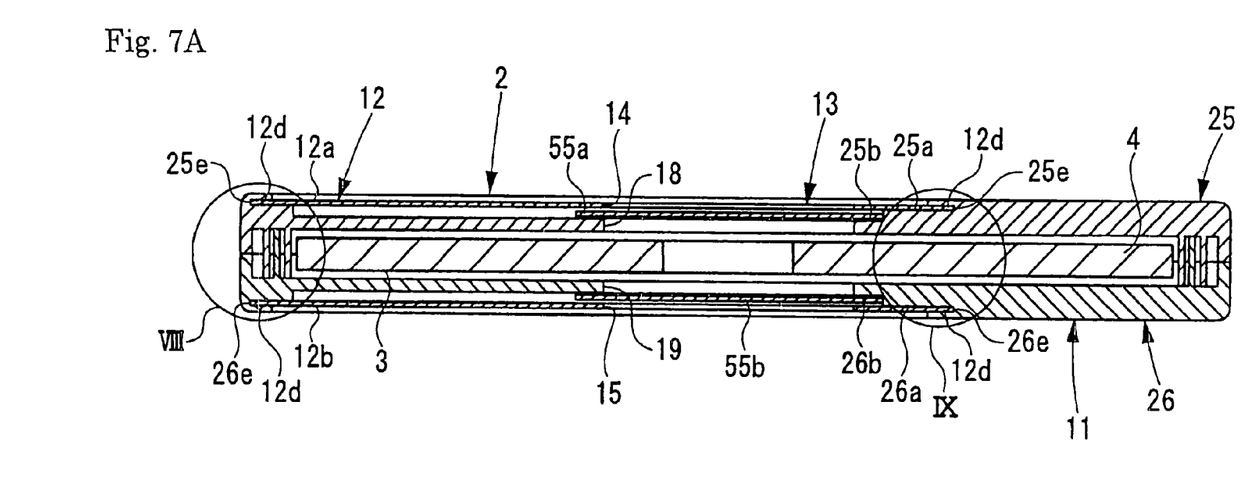
Figure 7B:
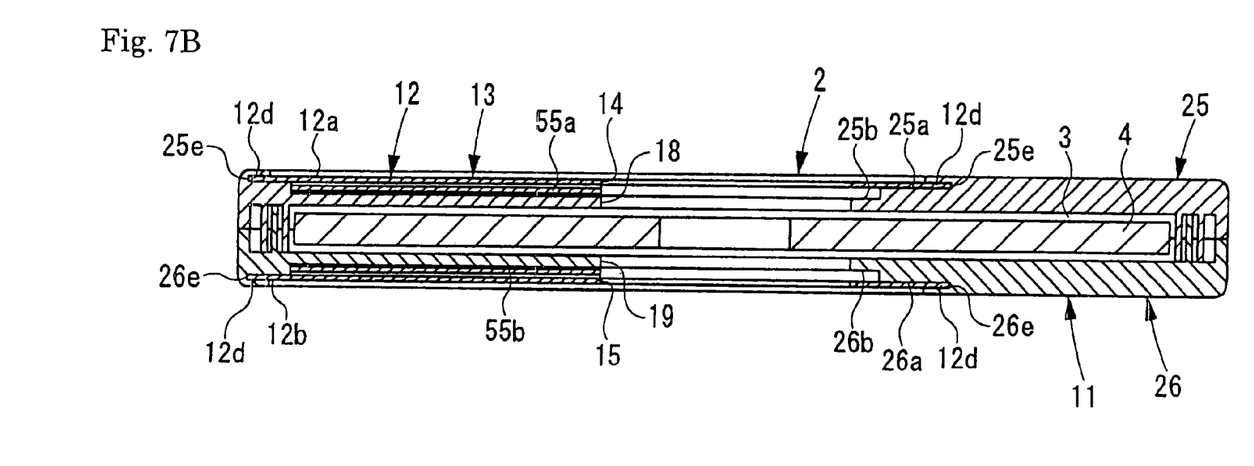
Figure 8:
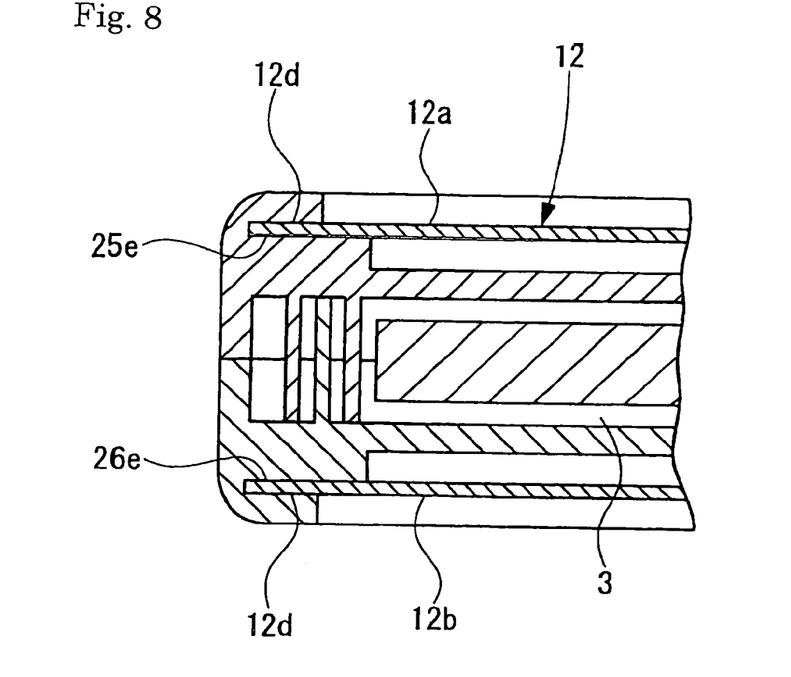
FIG. 8 is an enlarged view of a portion enclosed with a circle VIII in FIG. 7A.
Figure 9:
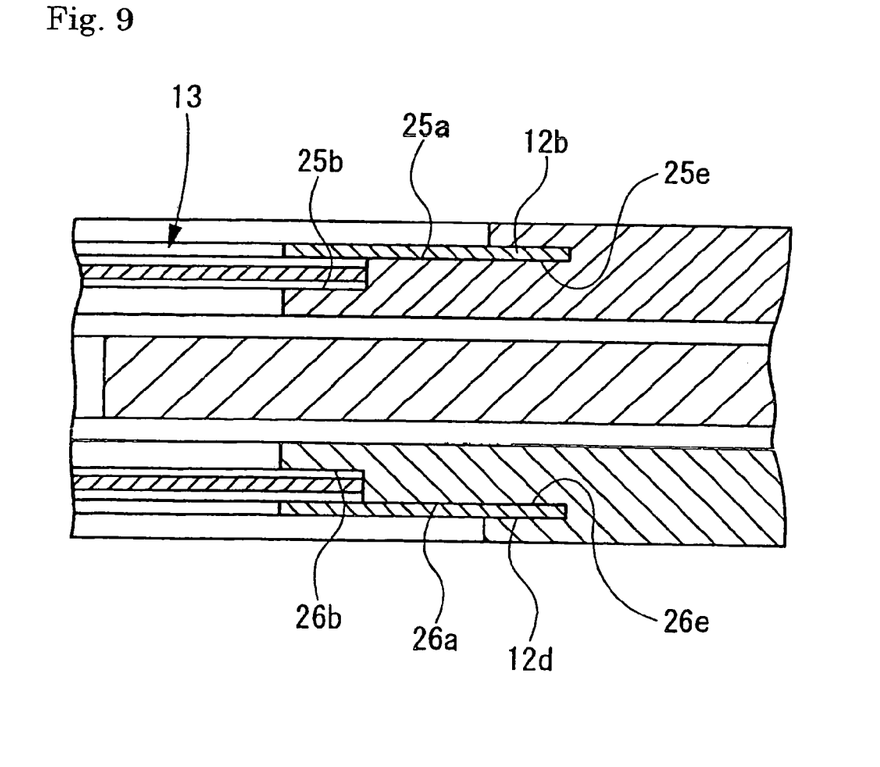
FIG. 9 is an enlarged view of a portion enclosed with a circle IX in FIG. 7A.

FIG. 4 is an exploded perspective view showing the configuration of the cartridge 2. FIG. 5 is an enlarged perspective view of a second shell which is a constituent member of the cartridge body. FIG. 6A is a sectional view of the cartridge in the mounting direction. FIG. 6B is an enlarged view of a portion in FIG. 6A. FIG. 6C is an enlarged view of another portion in FIG. 6A. FIGS. 7A and 7B are sectional views of the cartridge in a direction perpendicular to the mounting direction. FIG. 7A is a sectional view of a state in which the shutter is closed. FIG. 7B is a sectional view of a state in which the shutter is opened. FIG. 8 is an enlarged view of a portion enclosed with a circle VIII in FIG. 7A. FIG. 9 is an enlarged view of a portion enclosed with a circle IX in FIG. 7A.

As shown in FIG. 4, the cartridge body 11 includes a first shell 25 substantially shaped like a plate, a second shell 26 connected to the first shell 25, and a lock mechanism 27 put between the first shell 25 and the second shell 26 for locking the shutter 13.

For example, the first shell 25 and the second shell 26 are formed by injection molding out of one and the same thermoplastic or similar thermoplastics each containing additives of a light-shield substance and a lubricant. As shown in FIG. 6C which is an enlarged sectional view of an end edge portion of the cartridge 2, a first light-shield wall 30, a second light-shield wall 31 and a protrusive line 32 are provided in the inner surface of the first shell 25. The first light-shield wall 30 is a protrusive line formed into a size with a diameter larger than the outer diameter of the recording disc 4. The second light-shield wall 31 is provided in the outside of the first light-shield wall 30. The protrusion 32 is provided in the whole circumference of the end edge. The inner hole 18 exposing the central portion 4a and the recording surface 4b of the recording disc 4 to the outside is provided in the inside of the first light-shield wall 30.

A third light-shield wall 35 and a protrusive line 36 are provided in the inner surface of the second shell 26. The third light-shield wall 35 is a protrusive line formed into a size with a diameter larger than the outer diameter of the recording disc 4. The third light-shield wall 35 is inserted between the first light-shield wall 30 and the second light-shield wall 31 of the first shell 25. The protrusion 36 is provided in the whole circumference of the end edge. The inner hole 19 exposing the central portion 4a and the recording surface 4b of the recording disc 4 to the outside is provided in the inside of the third light-shield wall 35.

When the recording disc 4 is placed in the inside of the third light-shield wall 35 of the second shell 26 and the first shell 25 is superimposed on the upper surface of the second shell 26, the third light-shield wall 35 is inserted between the first light-shield wall 30 and the second light-shield wall 31 so that the front end of the third light-shield wall 35 abuts on an inner surface 25d of the first shell 25. The disc storage portion 3 is formed by these light-shield walls 30, 31 and 35 and the inner surfaces of the first and second shells 25 and 26. The side wall of the disc storage portion 3 is formed in a labyrinth-shaped light-shielding structure complicatedly made of the three light-shield walls 30, 31 and 35. With this structure, even when light or dust enters through a mating portion between the first and second shells 25 and 26, the light or dust never goes into the disc storage portion 3.

The front end of the third light-shield wall 35 of the second shell 26 is fixed to the inner surface 25d of the first shell 25 by ultrasonic welding. Accordingly, the first shell 25 and the second shell 26 are connected firmly to each other so that no gap is formed in the mating portion between the first shell 25 and the second shell 26.

As shown in FIG. 5, FIGS. 6A to 6C, FIGS. 7A and 7B, FIG. 8 and FIG. 9, light-shield plate attachment surfaces 25a and 26a each offset inward so as to be formed into a size slightly larger than the shape of the light-shield plate 12 and with a step having a depth not smaller than the thickness of the light-shield plate 12 are formed in the outer surfaces of the first shell 25 and the second shell 26. In addition, slits 25e and 26e are formed in a step portion between the outer surface of the first shell 25 and a light-shield plate attachment surface 25a and a step portion between the outer surface of the second shell 26 and a light-shield plate attachment surface 26a so as to be continuous from the light-shield plate attachment surfaces 25a and 26a. The slits 25e and 26e are recesses for receiving end edges 12d in the outer circumference of the light-shield plate 12, respectively. The groove width of each slit 25e, 26e is equal to or slightly smaller than the thickness of the light-shield plate 12. A first plate portion 12a and a second plate portion 12b of the light-shield plate 12 are forced and fixed into the slits 25e and 26e. Incidentally, although FIG. 5 shows only the outer surface of the second shell 26, the outer surface of the first shell 25 is also the same so that illustration and detailed description thereof will be omitted here.

A material, such as an aluminum alloy, which can obtain light-shielding characteristic, corrosion resistance, decoration effect and processablity and which is light in weight and strong is used as the material of the light-shield plate 12. Alternatively, the light-shield plate 12 may be formed out of a plastic. In this case, a plastic containing additives of a light-shield substance and a lubricant is preferably used in order to secure light-shielding characteristic and slidability of the shutter 13. As shown in FIG. 4, FIG. 5, FIGS. 6A to 6C, and FIGS. 7A and 7B, the light-shield plate 12 is formed by making outer holes 14 and 15 and a notch 40 for gaining a movement range of the shutter 13 in a thin aluminum alloy plate and bending the thin aluminum alloy plate substantially into a U shape in section. In this manner, the light-shield plate 12 is provided with a first plate portion 12a having the outer hole 14, a second plate portion 12b having the outer hole 15, and a third plate portion 12c including the notch 40 and connected to the first and second plate portions 12a and 12b.

The light-shield plate 12 is attached to the light-shield plate attachment surfaces 25a and 26a of the cartridge body 11 in such a manner that the B surface 2b and the A surface 2a of the cartridge body 11 are held by the first and second plate portions 12a and 12b and the front end of the cartridge body 11 in the mounting direction C is covered with the third plate portion 12c. On this occasion, end edges 12d on three sides of the first and second plate portions 12a and 12b are forced into the slits 25e and 26e respectively, so as to be fixed to the cartridge body 11 (See FIGS. 6A to 6C, FIGS. 7A and 7B, FIG. 8 and FIG. 9). The light-shield plate attachment surfaces 25a and 26a are offset inward to have a depth not smaller than the thickness of the light-shield plate 12 so that the outer surface of the light-shield plate 12 attached to the cartridge body 11 does not protrude from the surface of the cartridge 2.

Attachment of the light-shield plate 12 to the cartridge body 11 is not limited to the one performed by forcing the light-shield plate 12 into the slits 25e and 26e. The end edges 12d of the first and second plate portions 12a and 12b may be inserted into the slits 25e and 26e each having a groove width larger than the thickness of the light-shield plate 12. In this case, the light-shield plate 12 is fixed by pins, machine screws, etc. Incidentally, even when the end edges 12d are forced into the slits 25e and 26e, the light-shield plate 12 may be fixed auxiliarily by pins, machine screws, etc. in order to fix the light-shield plate 12 more firmly.

Specifically, small holes 49 are formed at intervals of an approximately equal pitch in the outer circumferences of the first and second plate portions 12a and 12b of the light-shield plate 12, as shown in FIG. 4. In addition, pins 50 each having a length slightly larger than the thickness of the light-shield plate 12 are formed integrally with the light-shield plate attachment surfaces 25a and 26a of the first and second shells 25 and 26 in positions corresponding to the holes 49 of the light-shield plate 12.

As shown in FIGS. 6A to 6C, FIGS. 7A and 7B, FIG. 8 and FIG. 9, when the light-shield plate 12 is attached to the outside of the cartridge body 11 (the light-shield plate attachment surfaces 25a and 26a), the pins 50 of the first and second shells 25 and 26 are inserted into the holes 49 so as to protrude from the surface of the light-shield plate 12. The light-shield plate 12 is fixed to the cartridge body 11 by melting down a front end of each of the pins 50 by heat.

As described above, the end edges 12d of the light-shield plate 12 are forced or inserted into the slits 25e and 26e respectively so as to be fixed to the cartridge body 11. Accordingly, a labyrinth-shaped light-shielding structure is formed by the slits 25e and 26e and the end edges 12d. Thus, light can be prevented from going round through the end edges 12d of the light-shield plate 12, so that light shielding can be achieved surely.

In addition to the aforementioned method, an adhesive agent, double-sided adhesive tape, screwing, etc. may be used as the method for fixing the light-shield plate 12 to the cartridge body 11. When the light-shield plate 12 is molded out of a plastic, various kinds of welding can be used. When the slits 25e and 26e are bonded or welded to the end edges 12d in the case where the light-shield plate 12 is fixed to the cartridge body 11 by an adhesive agent or welding, a gap between each of the end edges 12d of the light-shield plate 12 and the cartridge body 11 can be eliminated perfectly so that light-shielding performance can be further enhanced.

As shown in FIG. 4, the shutter 13 includes a shutter member 55 and a slide member 56. The shutter member 55 is formed by bending a thin light-shield plate substantially into a U shape. The slide member 56 is shaped like a long and narrow plate and attached to the shutter member 55. For the same reason as the light-shield plate 12, for example, the shutter member 55 is formed out of an aluminum alloy. Alternatively, the shutter member 55 may be formed out of a plastic. In this case, a plastic containing additives of a light-shield substance and a lubricant is preferably used in order to secure light-shielding characteristic and slidability. The slide member 56 is formed out of a plastic containing additives of a light-shield substance and a lubricant.

The shutter member 55 includes a first shutter 55a, a second shutter 55b and a joint 55c. The first shutter 55a is inserted between the outer surface of the first shell 25 and the first plate portion 12a of the light-shield plate 12. The second shutter 55b is inserted between the outer surface of the second shell 26 and the second plate portion 12b of the light-shield plate 12. The joint 55c is connected to the first and second shutters 55a and 56a while the slide member 56 is attached to the joint 55c.

Shutter slide surfaces 25b and 26b offset inward to have a depth not smaller than the thickness of the shutter member 55 are formed in the inside of the light-shield plate attachment surfaces 25a and 26a in the outer surfaces of the first and second shells 25 and 26. In this manner, the shutter 13 can move between the cartridge body 11 and the light-shield plate 12 so smoothly that generation of chips etc. due to the movement of the shutter 13 can be suppressed. Incidentally, the shutter slide surfaces 25b and 26b may be roughened in order to diffuse incident light. Similarly, the inner surface of the light-shield plate 12 and the inner and outer surfaces of the shutter 13 may be roughened.

The slide member 56 is put slidably between the first shell 25 and the second shell 26 so that the upper surface of the slide member 56 is exposed from the front end surface of the cartridge body 11 in the mounting direction. An attachment surface 56a to be attached to the inner surface of the joint 55c of the shutter member 55 is provided in one end portion of the upper surface of the slide member 56. For example, two pins 58b are formed integrally with the attachment surface 56a. When the two pins 56b are inserted into two holes 55d provided in the joint 55c and front ends of the pins 56b are melted down by heat, the shutter member 55 and the slide member 56 are fixed to each other. Incidentally, an adhesive agent, double-sided adhesive tape, etc. may be used for the fixation. Various kinds of welding may be used when the shutter member 55 is formed out of a plastic. In addition, screwing may be used.

Figure 10:
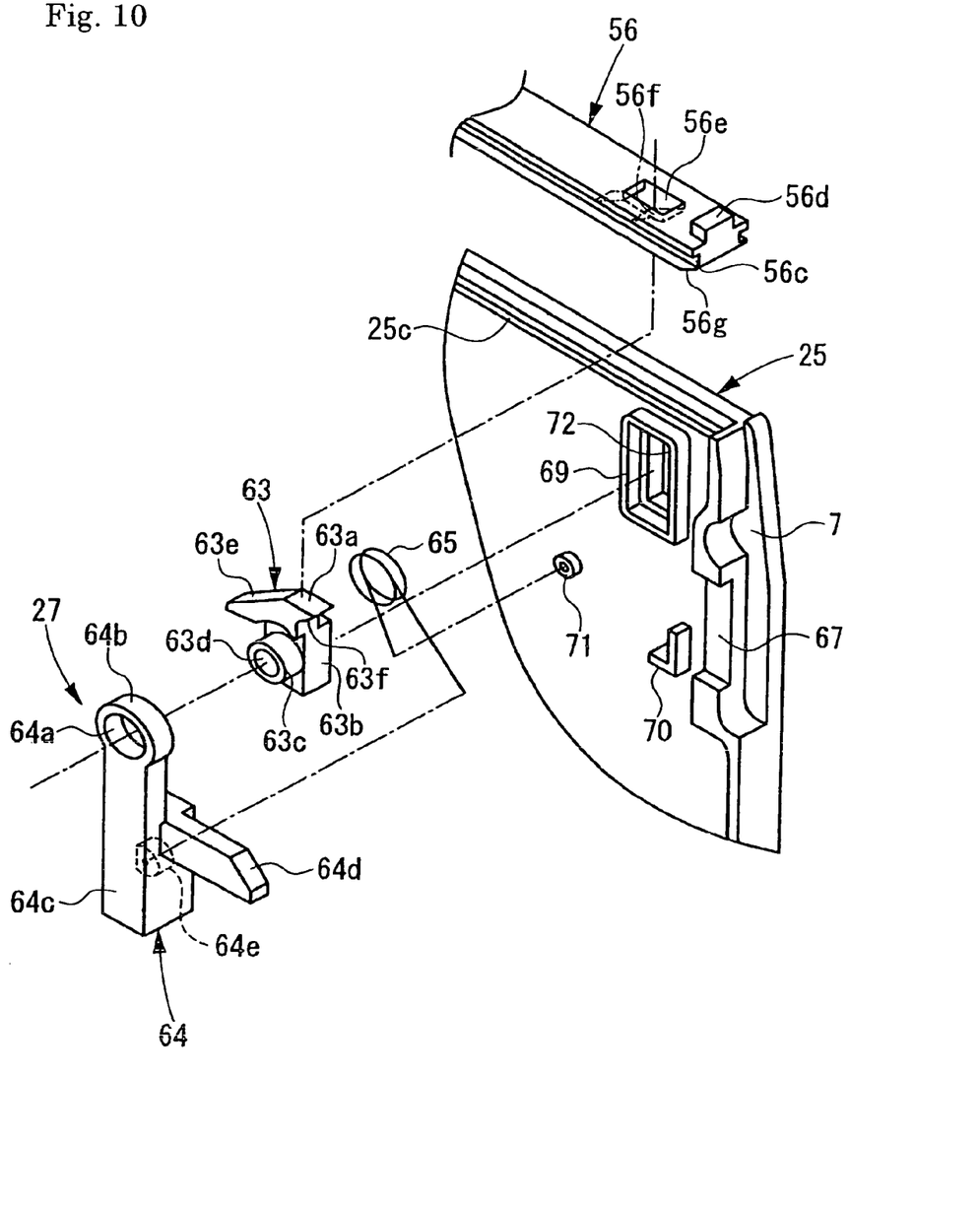
FIG. 10 is an exploded perspective view showing the configuration of a lock mechanism.

As shown in FIG. 6B and FIG. 10, grooves 56c are formed along a longitudinal direction in side surfaces of the slide member 56. Protrusive lines 25c and 26c provided in the inner surfaces of the first and second shells 25 and 26 on the front end side in the mounting direction are inserted into the grooves 56c. By means of the grooves 56c and the protrusive lines 25c and 26c, the slide member 56 can be moved slidably without being displaced from the cartridge body 11.

A to-be-operated portion 56d to be operated for opening the shutter 13 is formed integrally with the other end portion of the upper surface of the slide member 56. When the to-be-operated portion 56d provided thus is operated to extend the slide member 56 with respect to the shutter member 55 in a direction to close the shutter, the slide member 56 is exposed to the outside without being hidden by the third plate portion 12c of the light-shield plate 12. The notch 40 in the third plate portion 12c of the light-shield plate 12 is provided for avoiding interference with the to-be-operated portion 56d when the shutter 13 is moved to the open position (see FIG. 3).

The shutter 13 is urged in the closing direction by a shutter spring 59. For example, the shutter spring 59 is made of a torsion coil spring. Opposite ends of the shutter spring 59 are stopped by the slide member 56 and the inner surface of the first shell 25.

A lockable groove 56e shaped like a rectangular hole is formed in the slide member 56 adjacently to the to-be-operated portion 56d. An engagement inclined surface 56f inclined to the other end side (in the direction to close the shutter 13, i.e. in a direction opposite to the direction of the arrow D) of the slide member 56 little by little in the direction toward the front of the cartridge 2 in the mounting direction C is formed in the outer side surface of the lockable groove 56e in the longitudinal direction of the slide member 56 (see FIGS. 11A to 11C). A corner portion between a right end surface and a lower surface of the slide member 56 as shown in FIG. 10 is chamfered so as to form a guide inclined surface 56g substantially in parallel to the engagement inclined surface 56f.

Figure 11A:
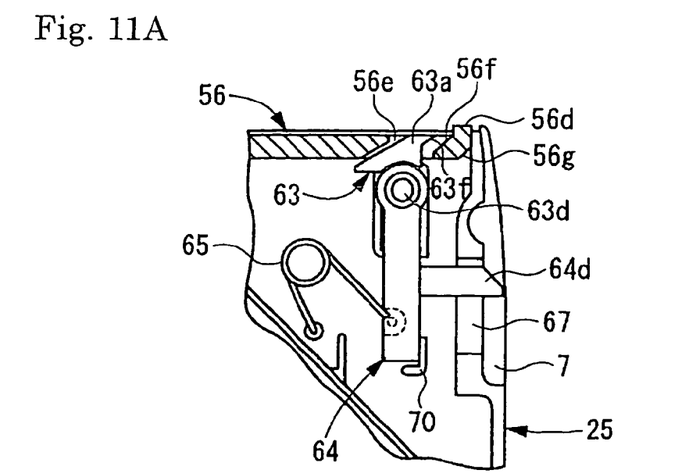
FIGS. 11A to 11C are views for explaining operation of the lock mechanism shown in FIG. 10.
Figure 11B:
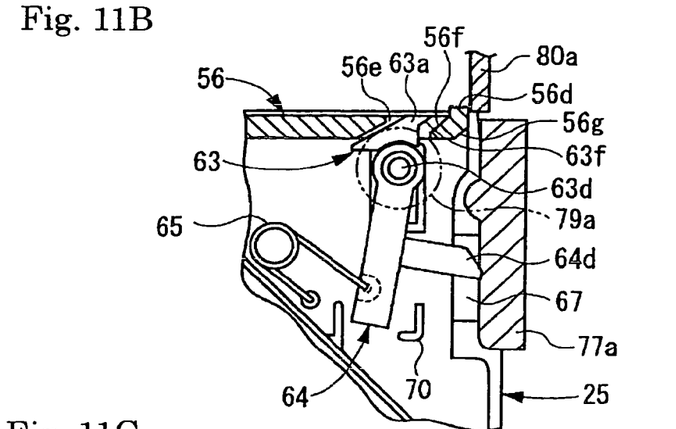
Figure 11C:
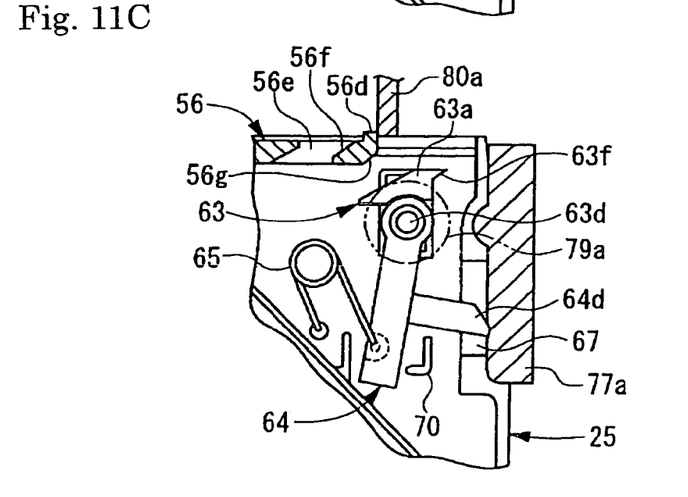
Figure 12:
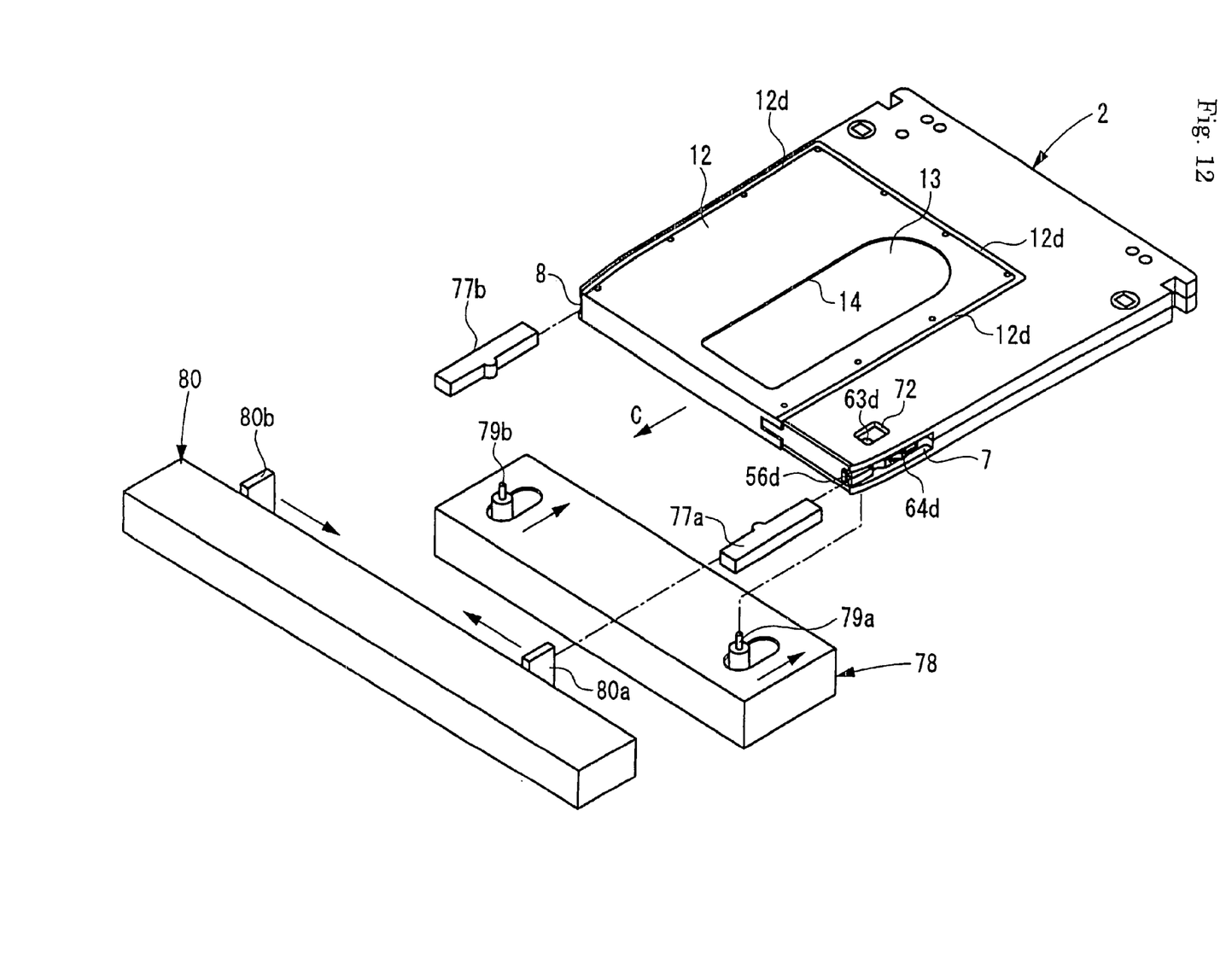
FIG. 12 is an explanatory view showing one example of various mechanisms for opening the shutter.

Next, the lock mechanism will be described with reference to FIG. 10, FIGS. 11A to 11C and FIG. 12. FIG. 10 is an exploded perspective view showing the configuration of the lock mechanism. FIGS. 11A to 11C are views for explaining operation of the lock mechanism shown in FIG. 10. FIG. 12 is an explanatory view showing one example of various mechanisms for opening the shutter.

As shown in FIG. 10, a lock mechanism 27 includes a first lock member 63, a second lock member 64, and a lock spring 65. The first lock member 63 locks the shutter 13 in the close position. The second lock member 64 locks movement of the first lock member 63. The lock spring 65 urges the second lock member 64 in an illustrated counterclockwise direction and upward.

The first lock member 63 includes a lock pawl 63a, a rectangular slide portion 63b, a cylindrical boss 63c, and an operation hole 63d. The lock pawl 63a locks the shutter 13 in the close position when the lock pawl 63a engages with the lockable groove 56e formed in the slide member 56. The slide portion 63b is provided integrally with the lock pawl 63a. The boss 63c is formed in a surface of the slide portion 63b facing the second shell 26. The operation hole 63d is formed by perforating the boss 63c and the slide portion 63b.

As illustrated in FIG. 10, a slope 63e provided for inducing engagement with the lockable groove 56e when the shutter 13 is moved from the open position to the close position is formed in the left side of the lock pawl 63a substantially in parallel with the engagement inclined surface 56f of the slide member 56. A hook portion 63f which is an inclined surface substantially parallel to the engagement inclined surface 56f of the lockable groove 56e is formed in the right side of the lock pawl 63a. When the slide member 56 is moved leftward (in a direction to open the shutter 13), the hook portion 63f engages with the engagement inclined surface 56f so as to surely stop the movement of the slide member 56.

The second lock member 64 includes a link portion 64b, a rotation portion 64c, a pressure piece 64d, and a spring stoppage portion 64e. The link portion 64b is provided with a hole 64a inserted onto the outer circumference of the boss 63c of the first lock member 63 rotatably. The rotation portion 64c is provided integrally with the link portion 64b so as to rotate around the boss 63c. The pressure piece 64d is provided erectly and vertically to a side surface of the rotation portion 64c. The spring stoppage portion 64e stops one end of a lock spring 65.

The first lock member 63 is moved between a first lock position as shown in FIG. 11A and a first unlock position as shown in FIG. 11C. In the first lock position, the hook portion 63f of the lock pawl 63a engages with the engagement inclined surface 56f of the lockable groove 56e of the slide member 56. In the first unlock position, the hook portion 63f slides downward so as to release engagement with the lockable groove 56e.

In the first lock position shown in FIG. 11A, a right end portion of the hook portion 63f of the lock pawl 63a and a left end portion of the engagement inclined surface 56f of the lockable groove 56e are disposed on a vertical line or with a slight gap formed horizontally. In other words, in this state, the hook portion 63f does not engage with the engagement inclined surface 56f so that the first lock member 63 can move downward.

When the slide member 56 moves slightly leftward as illustrated in the drawings, the engagement inclined surface 56f surely engages with the hook portion 63f so as to stop movement of the slide member 56. Incidentally, when the slide member 56 moves leftward, the shutter 13 also moves toward the opening direction. A movement distance for engagement of the engagement inclined surface 56f with the hook portion 63f is far smaller than an overlap quantity between the cartridge body 11 and the shutter 13 in the vicinities of the inner holes 18 and 19 so that the inner holes 18 and 19 are not opened.

The second lock member 64 is moved between a second lock position as shown in FIG. 11A and a second unlock position as shown in FIG. 11B. In the second lock position, the second lock member 64 is urged by the lock spring 65 vertically so that the pressure piece 64d is protruded from a notch 67 in the positioning groove 7. In the second unlock position, the second lock member 64 is rotated clockwise.

A rectangular slide frame 69, a regulation piece 70 and a boss 71 are formed in the inner surface of the first shell 25. The slide portion 63b of the first lock member 63 is inserted into the slide frame 69 so as to be slidable in an up/down direction. The regulation piece 70 catches one side surface and the bottom of the rotation portion 64c of the second lock member 64 so as to prevent the rotation portion 64c from rotating counterclockwise and sliding downward. The other end of the lock spring 65 is stopped by the boss 71. An opening 72 is formed in the slide frame 69 so as to expose the operation hole 63d of the first lock member 63 to the outside from the outer surface of the first shell 25. Similarly, an opening 73 exposing the operation hole 63d to the outside is formed in a position opposite to the opening 72 in the second shell 26.

FIG. 11A shows the state of the lock mechanism 27 of the cartridge 2 when the cartridge 2 is not in use. Since the second lock member 64 is urged upward by the lock spring 65, the lock pawl 63a of the first lock member 63 goes into the lockable groove 56e of the slide member 56. In this manner, when the shutter 13 is intended to slide from the close position to the open position, the engagement inclined surface 56f of the lockable groove 56e engages with the hook portion 63f of the lock pawl 63a so as to prevent the shutter 13 from sliding. The inclinations of the engagement inclined surface 56f and the hook portion 63f are shaped in such a manner that the engagement inclined surface 56f and the hook portion 63f are further interlocked with each other when the slide member 56 moves to open the shutter 13. Accordingly, movement of the slide member 56 is surely prevented.

Even if a rod or the like were inserted into the operation hole 63d of the first lock member 63 through either of the openings 72 and 73 provided in the first and second shells 25 and 26 in order to slide the first lock member 63, the lock cannot be released because the bottom of the second lock member 64 abuts on the regulation piece 70.

As shown in FIG. 12, for example, a pair of positioning members 77a and 77b, an unlock mechanism 78 and a shutter slide mechanism 80 are incorporated in a holographic recording apparatus which is used after mounted with the cartridge 2. The unlock mechanism 78 operates the first lock member 63. The shutter slide mechanism 80 slides the shutter 13 between the open position and the close position. The pair of positioning members 77a and 77b engage with the positioning grooves 7 and 8 in the opposite side surfaces of the mounted cartridge 2 so as to position the cartridge 2 in the insertion direction of the cartridge 2 and in a direction perpendicular to the insertion direction.

The unlock mechanism 78 has an engagement pin 79a and a slide mechanism. The engagement pin 79a is inserted into the operation hole 63d of the first lock member 63 from the opening 73 of the cartridge 2. The slide mechanism slides the engagement pin 79a in a direction to unlock the first lock member 63. Since data can be recorded on both surfaces of the recording disc 4, the cartridge 2 can be set in the apparatus while either of the A surface 2a and the B surface 2b of the cartridge 2 is made to face up. When the mounting surface is inverted, the lock mechanism 27 is located on a laterally reversed side. For this reason, the unlock mechanism 78 is provided with an engagement pin 79b to be used for inverse mounting so that the engagement pin 79b can engage with the operation hole 63d even when the cartridge 2 is mounted inversely. The engagement pins 79a and 79b are moved in a direction of an arrow simultaneously. Incidentally, when one of the engagement pins engages with the operation hole 63d, the other engagement pin will become an obstacle. For this reason, the engagement pins 79a and 79b may be designed to be retracted back when one of the engagement pins 79a and 79b abuts on the cartridge 2.

The shutter slide mechanism 80 has an operating piece 80a and a slide mechanism. The operating piece 80a abuts on the outer side of the to-be-operated portion 56d of the slide member 56. The slide mechanism slides the operating piece 80a in a direction to slide the shutter 13. This shutter slide mechanism 80 also has an operating piece 80b for handling inverse insertion of the cartridge 2. The operating pieces 80a and 80b are moved in directions of arrows simultaneously.

When the cartridge 2 is mounted in the holographic recording apparatus, the positioning member 77a is inserted into the positioning groove 7 as shown in FIG. 11B. The engagement pin 79a of the unlock mechanism 78 provided in this apparatus is inserted into the operation hole 63d of the first lock member 63. The operating piece 80a of the shutter slide mechanism 80 is disposed on the outer side of the to-be-operated portion 56d of the slide member 56. The positioning member 77a presses the pressure piece 64d of the second lock member 64 against the urging force of the lock spring 65. The second lock member 64 rotates clockwise around the link portion 64b and the bottom of the rotation portion 64c leaves the regulation piece 70, so that the first lock member 63 can slide downward.

As shown in FIG. 11C, the unlock mechanism 78 slides the engagement pin 79a in an unlock direction so as to withdraw the lock claw 63a from the lockable groove 56e so that the engagement is released. When the shutter slide mechanism 80 then slides the operating piece 80a toward the opening direction i.e. leftward in the drawing, the shutter 13 is opened. In this manner, the engagement is not released unless the second lock member 64 is rotated and the first lock member 63 is slid in the lock mechanism 27. Thus, it is possible to effectively prevent the shutter 13 from being opened unintentionally.

Various substances can be added as the light-shield substance added to the plastic used for molding the first shell 25 and the second shell 26. For example, it is preferable that 0.01% by weight to 5.00% by weight of various substances are added in accordance with the light-shield substance used. For example, carbon black can be used as the light-shield substance. Addition of carbon black can secure light-shielding characteristic and improve physical strength. The amount of carbon black to be added is preferably in a range of from 0.01% by weight to 2.00% by weight. Although an effect in improvement of light-shielding characteristic and physical strength is brought when the amount of carbon black to be added is larger than 0.01% by weight, physical strength is lowered if the amount of carbon black to be added is larger than 2.00% by weight.

For example, a silicone-based lubricant can be used as the lubricant. Because friction resistance is reduced by addition of the silicone-based lubricant, generation of chips due to movement of the shutter 13 can be suppressed. Moreover, generation of chips due to contact between the recording disc 4 and the inner wall of the cartridge body 11 on impact during the transit can be reduced. Moreover, handling property with respect to insertion into the apparatus is improved. In addition, because fluidity is improved, kneading characteristic at molding and processability at injection molding or the like are improved.

Incidentally, the amount of the silicone-based lubricant to be added is preferably in a range of from 0.1% by weight to 3.0% by weight. If the amount is not larger than 0.1% by weight, the effect is reduced. If the amount is not smaller than 3.0% by weight, fluidity is so excessive that a slip is generated between a screw and a resin at the time of kneading and molding. As a result, processability deteriorates, and the lubricant is bled out to a surface of a product and deposited on the recording disc 4, the user's hand or the like. This may cause disadvantages in handling property and external appearance. Incidentally, when copolymer silicone is used as the lubricant, the amount of the lubricant to be added can be increased to 5.0% by weight because such disadvantages hardly occur.

EXAMPLES

An example of the invention will be described below.

PC, PBT, ABS, POM, PS, PP, HDPE, PA, PET, PPS, SAN (styrene-acrylonitrile copolymer), PMMA, etc. may be used as the thermoplastics used for molding the first shell and the second shell. With respect to other components than the first shell and the second shell, a material different from the material used for the first shell and the second shell may be selected from the thermoplastics in order to prevent mistaken welding due to ultrasonic welding.

It is preferable that a plastic having light-shielding characteristic exhibiting visible light transmittance of not higher than 1.0% at a thickness of 0.2 mm is used for the first shell and the second shell, and that each shell is formed to have a thickness in a range of from 0.2 to 1.6 mm in order to obtain necessary physical strength. To obtain the plastic having such light-shielding characteristic, a light-shield substance may be added. Various materials can be used as the light-shield substance. It is preferable that 0.01% by weight to 5.00% by weight of a light-shield substance are added in accordance with the light-shield substance used. Examples of the light-shield substance are conceived as follows.

It is preferable that the first and second shells are made of one and the same thermoplastic or similar thermoplastics and the other components inclusive of the shutter are made of materials different from the materials of the first and second shells. In this manner, when the first and second shells are welded to each other, the first and second shells can be prevented from being welded to other components.

(1) Inorganic Compound

A. Oxide . . . silica, diatomaceous earth, alumina, titanium oxide, iron oxide (iron black), zinc oxide, magnesium oxide, antimony oxide, barium ferrite, strontium ferrite, beryllium oxide, pumice, pumice balloon, alumina fiber, etc.

B. Hydroxide . . . aluminum hydroxide, magnesium hydroxide, basic magnesium carbonate, etc.

C. carbonate . . . calcium carbonate, magnesium carbonate, dolomite, dawsonite, etc.

D. sulfate, sulfite . . . calcium sulfate, barium sulfate, ammonium sulfate, calcium sulfite, etc.

E. silicate . . . talc, clay, mica, asbestos, glass fiber, glass balloon, glass beads, calcium silicate, montmorillonite, bentonite, etc.

F. carbon . . . carbon black, graphite, carbon fiber, carbon hollow sphere, etc.

G. others . . . iron powder, copper powder, lead powder, aluminum powder, molybdenum sulfide, polonium fiber, silicon carbide fiber, brass fiber, potassium titanate, lead titanate zirconate, zinc borate, barium metaborate, calcium borate, sodium borate, aluminum paste, talc, etc.

(2) Organic Compound

Wood flour (pine, oak, saw-dust, etc.), chaff fiber (almond, peanut, rice hulls, etc.), cotton, jute, paper spline, non-wood fiber (straw, Kenaf, bamboo, esparto, bagasse, Jew's mallow, firework, etc.), cellophane piece, Nylon fiber, polypropylene fiber, starch (inclusive of denatured starch and surface-treated starch), aromatic polyamide fiber, etc.

Among these light-shield substances, inorganic compounds which little exert a bad influence on photographic characteristic, which are stable to heat at a temperature of 150° C. or higher and which are opacified are preferred. Light-absorbent carbon black, titanium nitride, graphite and iron black which are substances excellent in heat resistance and light resistance and relatively inactive are especially preferred.

When carbon black is used as the light-shield substance, the amount of carbon black to be added is preferably selected to be in a range of from 0.01% by weight to 2.00% by weight. As described above, the purpose is to obtain a plastic good in the balance of light-shielding characteristic and physical strength.

Examples of classification of raw materials of carbon black include gas black, furnace black, channel black, anthracene black, acetylene black, ketjen carbon black, thermal black, lampblack, oil soot, pine oil soot, animal black, vegetable black, etc.

Typical examples of preferred carbon black available on the market include carbon black #20(B), #30(B), #33(B), #40(B), #41(B), #44(B), #45(B), #50, #100, #600, #950, #1000, #2200(B), #2400(B), MA8, MA11, MA100, etc. made by Mitsubishi Chemical Corporation. Various grades of Denka black made by DENKI KAGAKU KOGYO KABUSHIKI KAISHA, Seast made by TOKAI Carbon Co., Ltd., Asahi #78 made by Asahi Carbon Co., Ltd., Showa black made by Showa Cabot K.K, Niteron made by Nippon Steel Chemical Carbon Co., Ltd., Diamond black made by Mitsubishi Chemical Corp., etc. may be also used.

Examples of overseas products include Black Pearls 2, 46, 70, 71, 74, 80, 81, 607, etc., Regal 300, 330, 400, 660, 991, SRF-S, etc., Vulcan 3, 6, etc., Sterling 10, SO, V, S, FT-FF, MT-FF, etc. made by Cabot Corp. In addition, examples can include United R, BB, 15, 102, 3001, 3004, 3006, 3007, 3008, 3009, 3011, 3012, XC-3016, XC-3017, 3020, etc. made by Ashland Specialty Chemical Company. The invention is not limited thereto.

A silicone-based lubricant can be used as the lubricant added to the first shell and the second shell. Especially, various grades of dimethyl polysiloxane may be used. Various grades of dimethyl polysiloxane available on the market and made by TORAY Industries, Inc., Dow Corning, Silicone, GE Toshiba Silicone Co., Ltd., Wacker Asahikasei Silicone Co., Ltd., Shin-Etsu Chemical Co., Ltd., etc. can be used. Incidentally, either master batch or kneaded article can be used. Incidentally, the amount of the silicone-based lubricant to be added is preferably selected to be in a range of from 0.1% by weight to 5.0% by weight. As described above, the purpose is to obtain a plastic good in balance of friction resistance, product optimization and product quality.

The cartridge body is preferably formed so that an inner surface of the cartridge body to the photosensitive recording medium and an outer surface of the cartridge body to the shutter are matted or embossed with a surface roughness Ra of 5 to 20 μm. In this manner, light can be diffused and attenuated by the rough surface even in the case where light enters the inside of the cartridge or between the cartridge body and the shutter. Accordingly, the influence on the photosensitive recording medium can be reduced.

If the surface roughness Ra of the rough surface provided in each shell is not larger than 5 μm, the light-diffusing effect is small. If the surface roughness Ra is not smaller than 20 μm, there is a possibility that the surface of contact with the recording disc will be scratched. For this reason, the surface is preferably matted or embossed with a surface roughness Ra of from 5 to 20 μm.

An Al—Mg-based alloy is preferably used as the aluminum alloy for the light-shield plate 12 and the shutter member 55. For example, JIS alloy Nos. 5052, 5056, etc. are preferred. In order to enhance the strength more greatly, JIS alloy Nos. 5083, 5086, etc. are preferred more especially. In order to enhance the strength further greatly, an Al—Mg—Si-based alloy (such as JIS alloy Nos. 6063 and 6061), an Al—Cu-based alloy (such as JIS alloy Nos. 2014 and 2017), an Al—Zn—Mg-based alloy (such as JIS alloy Nos. 7003, 7N01, 7075 and 7050), etc. may be used. In view from reduction in weight and easiness of processability, it is preferable that the thickness of each of the light-shield plate 12 and the shutter member 55 is not larger than 1.00 mm. More preferably, the thickness is in the range of from 0.15 mm to 0.5 mm.

In addition, each of the light-shield plate 12 and the shutter member 55 may be made of a plastic. As the plastic used, for example, POM etc. is preferred. Similarly to the aforementioned first shell, it is preferable that a light-shield substance and a lubricant are added.

In view from spring constant, durability, processability, etc., stainless steel for austenite-based spring is preferably used as the material of each of the shutter spring and the lock spring. For example, SUS 300 series can be used. The line diameter of the shutter spring is preferably in the range of from 0.2 mm to 0.7 mm. The line diameter of the lock spring is preferably in the range of from 0.15 mm to 0.4 mm.

Although description has been made on the case where the first shell and the second shell are fixed to each other by ultrasonic welding, other welding methods and fixation methods may be used. When, for example, the first and second shells are fixed to each other by screws etc., it is preferable that a light-shielding structure is formed in the circumference of each screw hole. In addition, although each of the second shell and the first shell is formed by one component, each of the second shell and the first shell may be formed by assembling a plurality of components. When, for example, each of the second shell and the first shell is formed by two components with the shutter storage portion as a boundary, mold can be simplified.

Although description has been made on the case where a cartridge for storing a double-side recordable recording disc is taken as an example, the cartridge may be formed for storing a single-side recordable recording disc. In this case, an opening is formed only in one surface and this opening is opened/closed by the shutter. Although description has been made on the case where a cartridge for storing a holographic recording medium is taken as an example, the invention can be applied also to a cartridge for storing a recording medium having another photosensitive characteristic.

This application is based on Japanese Patent application JP 2005-238524, filed Aug. 19, 2005, the entire content of which is hereby incorporated by reference, the same as if set forth at length.

What is claimed is:

1. A photosensitive recording medium cartridge comprising:
   a disc-shaped photosensitive recording medium;
   a cartridge body receiving the photosensitive recording medium therein so that the photosensitive recording medium can rotate, the cartridge body having a first opening for exposing a center and a recording surface of the photosensitive recording medium to the outside;
   a light-shield plate attached to the outside of the cartridge body and having a second opening which faces the first opening and which exposes the center and another recording surface of the photosensitive recording medium to the outside; and
   a shutter which is put between the cartridge body and the light-shield plate, which is disposed so as to be movable between a close position for closing the first opening and an opening position for unclosing the first opening and which has an external size larger than that of each of the first opening and the second opening,
   wherein the cartridge body is provided with recesses into which end edges of the outer perimeter of the light-shield plate are inserted, and
   wherein the cartridge body is formed so that an inner surface of the cartridge body to the photosensitive recording medium and an outer surface of the cartridge body to the shutter are matted or embossed with a surface roughness Ra of 5 to 20 µm.

2. The photosensitive recording medium cartridge according to claim 1, wherein the end edges of the light-shield plate are forced into the recesses so that the light-shield plate is fixed to the cartridge body.

3. The photosensitive recording medium cartridge according to claim 2, wherein the cartridge body, the light-shield plate and the shutter are formed from a plastic to which 0.01% by weight to 5.00% by weight of a light-shield substance are added, and/or a metal thin plate.

4. The photosensitive recording medium cartridge according to claim 2, wherein the cartridge body includes a first shell substantially shaped like a plate, and a second shell lap-welded with the first shell, the first and second shells being made of a thermoplastic, the other components inclusive of the shutter being made of materials different from the materials of the first and second shells.

5. The photosensitive recording medium cartridge according to claim 4, wherein 0.01% by weight to 5.00% by weight of a light-shield substance are added to a plastic used for molding each of the first and second shells and the shutter.

6. The photosensitive recording medium cartridge according to claim 4, wherein 0.01% by weight to 2.00% by weight of carbon black are added to a plastic used for molding each of the first and second shells and the shutter.

7. The photosensitive recording medium cartridge according to claim 4, wherein 0.1% by weight to 5.0% by weight of a silicon-based lubricant are added to a plastic used for molding each of the first and second shells and the shutter.

8. The photosensitive recording medium cartridge according to claim 2, wherein the photosensitive recording medium is a holographic recording medium.

9. The photosensitive recording medium cartridge according to claim 1, wherein the cartridge body, the light-shield plate and the shutter are formed from a plastic to which 0.01% by weight to 5.00% by weight of a light-shield substance are added, and/or a metal thin plate.

10. The photosensitive recording medium cartridge according to claim 1, wherein the cartridge body includes a first shell substantially shaped like a plate, and a second shell lap-welded with the first shell, the first and second shells being made of a thermoplastic, the other components inclusive of the shutter being made of materials different from the materials of the first and second shells.

11. The photosensitive recording medium cartridge according to claim 10, wherein 0.01% by weight to 5.00% by weight of a light-shield substance are added to a plastic used for molding each of the first and second shells and the shutter.

12. The photosensitive recording medium cartridge according to claim 10, wherein 0.01% by weight to 2.00% by weight of carbon black are added to a plastic used for molding each of the first and second shells and the shutter.

13. The photosensitive recording medium cartridge according to claim 10, wherein 0.1% by weight to 5.0% by weight of a silicon-based lubricant are added to a plastic used for molding each of the first and second shells and the shutter.

14. The photosensitive recording medium cartridge according to claim 1, wherein the photosensitive recording medium is a holographic recording medium.

* * * * *